United States Patent [19] [11] 3,931,830
Gritz [45] Jan. 13, 1976

[54] PUMP SYSTEMS FOR LIQUIDS
[75] Inventor: Darrell D. Gritz, Little Rock, Ark.
[73] Assignee: Jacuzzi Bros. Incorporated, Little Rock, Ark.
[22] Filed: Mar. 20, 1974
[21] Appl. No.: 452,745

Related U.S. Application Data
[62] Division of Ser. No. 327,955, Jan. 30, 1973, Pat. No. 3,814,543.

[52] U.S. Cl. ........... 137/505.45; 137/513.5; 417/38
[51] Int. Cl.² .................. F16K 31/12; F16K 15/00; F04B 49/00
[58] Field of Search ........... 417/36, 38; 137/505.44, 137/505.45, 513.5, 568

[56] References Cited
UNITED STATES PATENTS
2,737,975   3/1956   Wilkins .................... 137/505.44
3,141,475   7/1964   Guinard et al. .................... 137/568
3,625,247   12/1971  Dargatz .......................... 137/505.44
3,739,810   6/1973   Horan ................................ 417/38

FOREIGN PATENTS OR APPLICATIONS
1,813,599  10/1969   Germany .......................... 137/513.5

Primary Examiner—William L. Freeh
Assistant Examiner—S. P. LaPointe

[57] ABSTRACT

A system for pumping of liquid under pressure, in which a pressure switch is adapted to control the starting and stopping of the pump within a safe pressure range, and in the event of malfunction of the pressure switch, the service line and associated plumbing is isolated from the pump to protect against development of pressures in the serviceline which might damage the plumbing.

2 Claims, 7 Drawing Figures

PUMP SYSTEMS FOR LIQUIDS

This is a division of application Ser. No. 327,955, filed Jan. 30, 1973. now U.S. Pat. No. 3,814,543.

My invention relates to systems for pumping of liquid under pressure and more particularly to water pressure systems.

While the system of the present invention can be employed in general to the pumping of liquids under pressure, it is more specifically adapted to water pressure systems and will be described with respect to its application of such a system.

In water pressure systems of the type to which the present invention relates, a pump supplies one or more branch service lines, each terminating in a service valve. A pressure switch normally exposed to pressures within a service line, is adjusted to energize the pump drive motor when the pressure in the service line drops to a predetermined low value, say of the order of twenty or thirty pounds per square inch, and de-energize the pump drive motor should the pressure in the service line reach a predetermined high value of the order of say fifty pounds per square inch.

Where the system involves a number of branch service lines or, in some cases, where the pump is not matched to the system which it is to supply, the pump may be capable of developing pressures far in excess of the shut-down value setting of the pressure switch and such pressures, if permitted to develop in the service line can wreck havoc with the plumbing associated with this portion of the system. This kind of a disruptive situation can develop should the pressure swith for example, fail to function to de-energize the pump motor when the service demand ceases, thus allowing the pump to continue functioning despite the fact that there is no demand for service. Under the circumstances, there will be a build up of pressure in the service line, to the capability of the pump, and this could be destructive of plumbing associated with the service line.

Among the objects of my invention are:

1. To provide a novel and improved pump system for supplying liquid under pressure within a safe range and which will preclude a rise in pressure in the service line to values dangerous to existing plumbing should the pump fail to shut down when the demand for service ceases.

2. To provide a novel and improved pump system having automatic pump start and stop control, wherein upon failure of the stop control to shut down a pump, the service line of the system is isolated from the pump.

Additional objects of my invention will be brought out in the following description of a preferred embodiment of the same, taken in conjunction with the accompanying drawings wherein.

Figure 1:
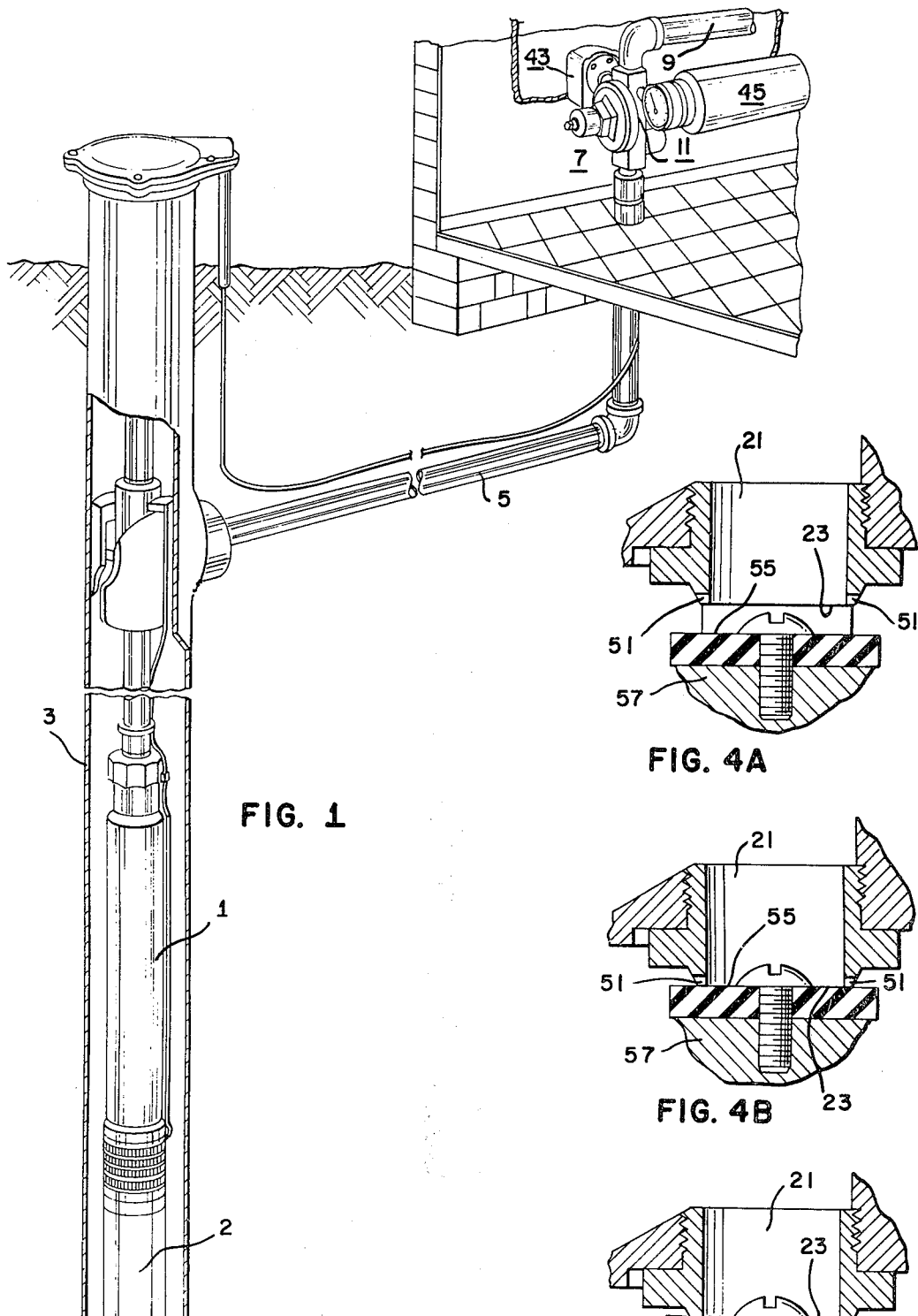
FIG. 1 is a view depicting one type of water system and the application of the present invention hereto.
Figure 3:
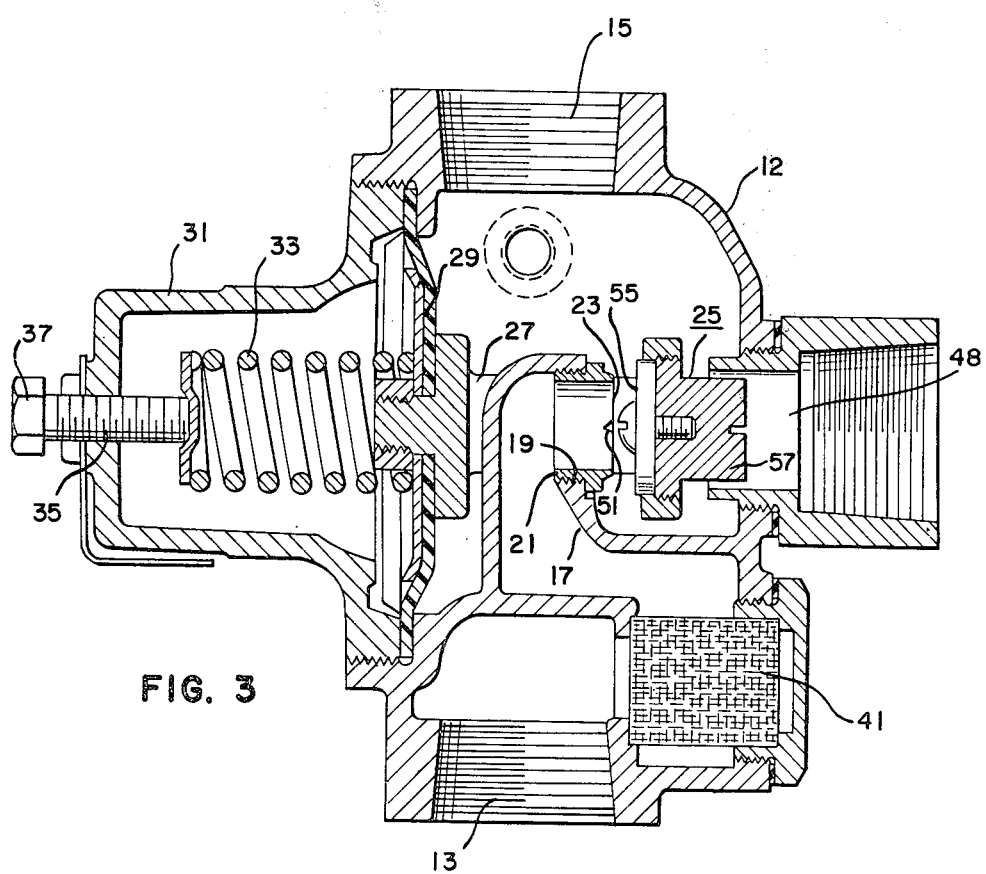
FIG. 3 is a view in section taken through pressure regulator valve assembly constituting an important component of the control assembly of FIG. 2.
Figure 5:
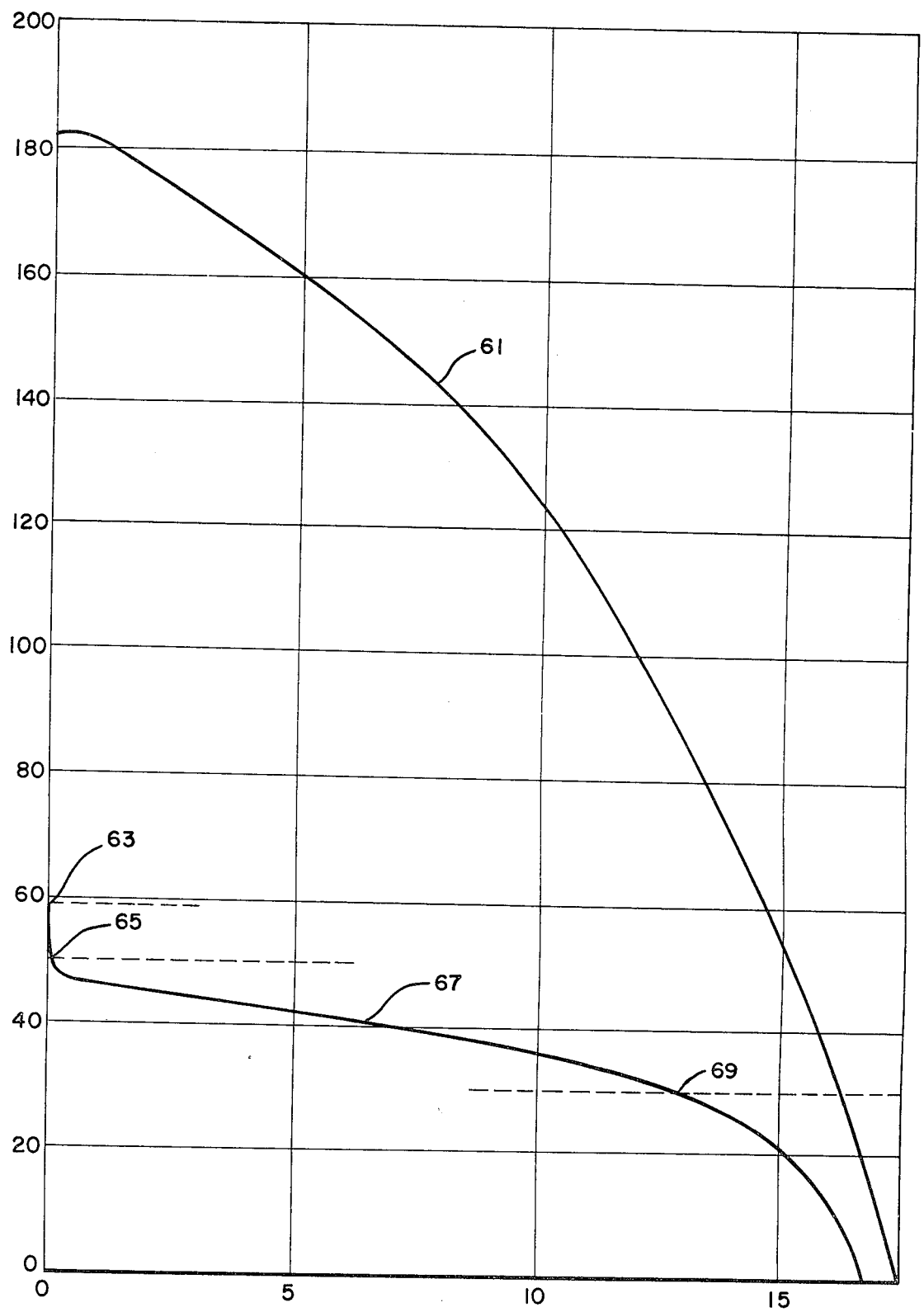

FIGS. 4a, 4b, and 4c are related views depicting the manner of operation of a valve involved in the pressure regulator valve assembly of FIG. 3;

FIG. 5 involves comparative curves depicting a typical pump performance curve for a pump of the submersible type illustrated in the system of FIG. 1, and a curve depicting the corresponding pressures which would exist in the service line of the system with the present invention incorporated therein.

Figure 2:
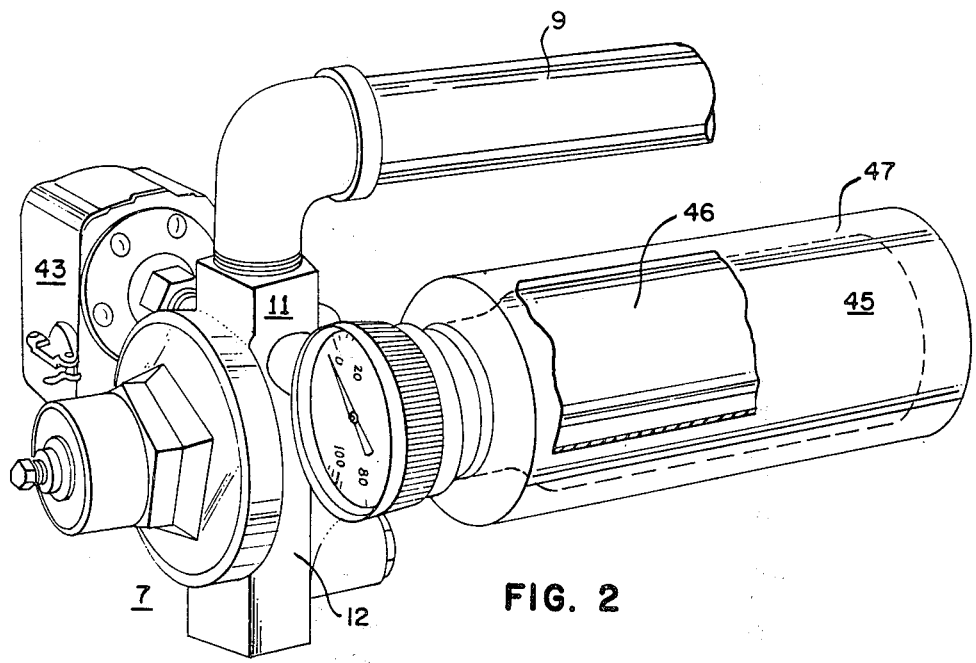
FIG. 2 is a view in perspective of a control assembly in such system and which embodies the present invention.

Referring to the drawings for details of my invention in its preferred form, I have illustrated the invention in FIG. 1 as embodied in a system of the submersible pump type which involves a submersible pump 1 and drive motor 2, both submerged below water level in a well casing 3 from which the pump discharges through a line 5 to a control assembly 7 such as depicted in the enlarged view in FIG. 2, and from which a main service line 9 extends. The service line may couple to a plurality of branch service lines, each terminating in a service valve (not illustratted but which may be of any conventional type).

To control assembly 7 includes a novel and improved pressure regulating valve assembly 11 constituting the heart of the present invention.

This pressure regulating valve assembly involves a housing 12 having a threaded inlet opening 13 at one end for connection of the pump discharge line 5, to receive liquid at the prevailing pump pressure, and a threaded outlet opening 15 at the opposite end for connection of the service line 9.

The inlet opening is blocked off by the partition 17 having a threaded opening 19 therethrough substantially at right angles to the axis of the inlet opening, and into which a threaded fitting 21 is installed to provide a valve seat 23.

In axial alignment with such valve seat, is a valve 25 supported by a bracket 27 from a diaphram 29 spanning an opening in the housing and retained in such position by a spring housing 31 threadedly installed in such opening.

In the spring housing is a compression spring 33 seating at one end against the diaphragm and at its other end, engaging the end of an adjusting screw 35 installed through the end of the spring housing, leaving the screw head 37 exposed for adjustment purposes. The adjustment of the spring determines the value of the regulated pressure at the outlet opening 15 of the valve assembly in accordance with conventional practice.

A screen 41 in the flow path between the inlet opening 13 and the partition opening 19, will serve to screen out any debris in the water coming from the pump.

As thus far described, the pressure regulating valve assembly receives liquid under pressure through the inlet opening from the pump, when running, such liquid passing through the valve and, depending on conditions beyond the outlet opening, will build up a back pressure against the diaphragm in opposition to the compression spring, and when such back pressure overcomes the pressure setting of the spring, the diaphragm will begin to move toward and compress the spring, in the course of which, it will carry the valve in the direction of sealing. During such movement of the valve, a resulting increase in pressure drop across the valve will result in a tendency for the diaphragm to be restored to its original position. As a result, the valve will hover about a position which will enable the pressure at the outlet opening to be maintained at substantially a value corresponding to the setting of the spring, despite the pump pressure at the inlet end of the valve assembly.

Threadedly coupled to the housing of the pressure regulator valve assembly and exposed to the pressure on the outlet side of the valve, is a pressure switch 43, which, by reason of such coupling, is exposed to the pressure revailing in the service line of this sytem. This pressure switch is connected in the conventional manner, in circuit with the motor 2 which drives the pump 1 and is adjusted to connect the pump motor in circuit when the pressure in the service line drops to a predetermined low value, say of the order of 20 or 30 pounds per square inch, and disconnect such pump motor when the pressure in the service line raises to a higher predetermined value, which is still safe for the plumbing associated with the service line.

In conjunction with the pressure regulator valve assembly and the pressure switch, is a small expandable cell assembly 45 or pressure device whose function is to maintain pressure in the service line during quiescent conditions of the system, and upon opening of a service line, to quickly drop the pressure to the low pressure setting of the pressure switch to start the pump motor, while at other times delaying the start up of the pump motor in the event of small leaks in the system. Such assembly comprises a rubber bladder 46 in a receptacle 47 which limits permissible expansion of the bladder to a limited volume or capacity of the order of 12 ounces of water.

This pressure device is preferable threadedly installed in a passageway 48 in the pressure regulator housing on the low pressure side, the passageway preferably being in alignment with the valve 25.

With such pressure maintaining device coupled into the system, then during closing off of demand for service, the pressure device will be charged to the pressure prevailing in the service line at the time of shut off. Upon subsequently opening of a service valve the pressure device will promptly discharge to the pressure value at which the pressure switch will start the pump motor and cause the pump to function.

Though the pump may conceivably, at times, build up to pressures which if permitted to develop in the service line, would likely damage plumbing associated with the service line portion of the system, the pressure actually developed in the service line, while supplying service requirements, will, due to the functioning of the pressure regulator be considerably less and at a safe value, as determined by the setting of the pressure regulator spring.

It is, however, during that period in the operation of the system, when the damands from service are approaching cut-off, that pressure trouble in the service line can be expected, for, if, during this period of operation, high pressures are permitted to develop in the service line, such pressures will be maintained by the pressure device, and will continue to be maintained until the next service demand on the system. Thus the plumbing associated with the service line, under these conditions, might well be exposed to destructive pressure for extended periods of time and with probable resulting damage to such plumbing. It becomes imperative therefore, to prevent the development of such destructive pressures during the closing of a service valve in terminating demands for service.

This requirement will normally be met by satisfactory functioning of the pressure switch, which is set to shut down the pump while service line pressure is still at a safe value. However, should the pressure switch malfunction, the pump will continue running despite the closing of all service valves and under this condition, the pump, in a conventional system, would be free to develop its maximum capable pressure in the service line. The system of the present invention, in its preferred form, solves this latter problem through a simple modification of the structure of the pressure regulator valve assembly.

In accordance with such modification, the valve seat 23 is rendered imperfect by the provision of one or more small V notches 24 in the seat itself, and the valve component 25 is provided with a sealing disc 55 of rubber or equivalent material, preferably of neoprene rubber of 50–65 durometer, held to a backing plug 57 of metal which is threaded into the supporting bracket 27. The metal backing plug, referably extends into the passageway 48 and is provided at its remote end with a screw driver slot. Thus, upon removal of the pressure device, the valve may be installed or removed by way of the passageway with the use of common tools.

The rotches may be of 60° angle, to a depth of 0.032 inches across the valve seat, depending on characteristics of the sealing material.

Actual sealing material and notch dimensions may vary to satisfy varying conditions in different systems.

In maintaining a regulated pressure at the outlet side of the pressure regulator valve, the spacing of the valve from its valve seat will vary with service demands. As the demands become less, as during closing of a service valve, the valve will move toward its closing position. Ultimately, as the service line demand approaches zero, the valve will seat except for the notches which provide by-pass leak passages for a limited amount of flow. When such limited amount of flow exceeds the dwindling demand of service, a pressure build-up will be initiated in the service line, which, within a rise of the order of nine pounds, for example, depending on the character of the sealing disc material and size of notches, will compress the sealing disc into the notches and completely block off the service line from the pump, whereby, if in the mean time the pressure switch had malfunctioned and failed to shut down the pump motor, the continued operation of the pump could not effect prevailing pressure in the service line, as the service line would now be completely isolated or blocked off from the pump.

Thus, though the pump itself might be capable of developing excessively high pressures, which would be destructive to plumbing associated with the service line, the service line portion of the system would now be protected against the development of such excessively high pressures.

Through the use of notches to provide the by-pass paths around the valve, as distinguished from small holes or the like, clogging is avoided, as the notches become self cleaning during openings of the valve.

As an example of an installation embodying the present invention, reference will be made to the characteristic curves of FIG. 5 which relate to a typical submserible pump system such as illustrated in FIG. 1.

In this particular system, the pump preformance curve 61 indicates that at a discharge of 1/2 gallons per minute, the pump was capable of developing a maximum pressure exceeding 180 pounds per square inch, far in excess of what may be deemed a safe value for plumbing. The pressure regulating valve was capable of blocking off the service line from the pump at a safe pressure 63 in the service line, of the order of 59 psi, the pressure switch in this instance, being set to disconnect the pump motor at a lower value 65 of the order of 50 psi. Thus the actual shut-off, in the event of the pressure switch failure, is approximately 9 pounds higher than the cut-off pressure setting of the pressure switch, this difference being such as to adequately allow for tolerance in the operation of pressure switches and thus assure the pressure switch adequate opportunity to function before the pressure regulator could isolate the service line should the pressure switch malfunction and the pump continue to run.

Relative to such safe value pressure as indicated by the reference numeral 63, the pressure regulator valve assembly is adjusted to deliver at pressure below such value along a curve 67, starting at the cut-in pressure 69 of the pressure switch, with the cut-off pressure setting of the pressure switch at the value designated by the reference numeral 65, all as clearly depicted in FIG. 5.

From the foregoing description of my invention in its preferred form as applied to a water system, it will be apparent that the same is applicable for the pumping of liquids in general and is subject to alteration and modification without departing from the underlying principles involved. I, accordingly, do not desire to be limited in my protection to the specific details illustrated and described, except as may be necessitated by the appended claims.

I claim:

1. A pressure regulating valve assembly comprising a housing having an input opening for receiving liquid under pressure, an outlet opening for discharging such liquid at a reduced pressure, and a valve component and associated valve seat component intermediate said inlet and outlet openings and in the flow path between them, one of said components having a notch in a surface facing the other component, and said other component including a disc of compressible material and a solid backing for said disc to preclude flexing thereof while enabling compression of said disc upon closing of said valve component upon said seat component, said notch being of a depth such that upon closing of said valve upon said valve seat, said disc material will compress into and fill said notch to block flow therethrough.

2. A pressure regulator valve assembly in accordance with claim 1, characterized by said notch being in said valve seat component and said disc being included in said valve component, means threadedly supporting said valve component for adjustment with respect to said valve seat component, said valve component having a plug or valve stem extending toward said outlet opening and provided with tool engaging means to permit threading of said valve component with respect to said supporting means by means of a tool inserted through said outlet opening.

* * * * *